(12) United States Patent
Hudelmaier et al.

(10) Patent No.: US 10,868,459 B2
(45) Date of Patent: Dec. 15, 2020

(54) ELECTROMECHANICAL ACTUATOR COMPRISING A REDUNDANT ELECTRONIC SUB-SYSTEM

(71) Applicants: Robert Bosch GmbH, Stuttgart (DE); Robert Bosch Automotive Steering GmbH, Schwäbisch Gmünd (DE)

(72) Inventors: Gebhard Hudelmaier, Mögglingen (DE); Eugen Sworowski, Lorch (DE); Thomas Hessler, Lichtenstein (DE); Hans-Peter Mueller, Reutlingen (DE); Sylvia Wiedemann, Ludwigsburg (DE)

(73) Assignees: Robert Bosch GmbH, Stuttgart (DE); Robert Bosch Automotive Steering GmbH, Schwäbisch Gmünd (DE)

( * ) Notice: Subject to any disclaimer, the term of this patent is extended or adjusted under 35 U.S.C. 154(b) by 342 days.

(21) Appl. No.: 15/775,547

(22) PCT Filed: Oct. 28, 2016

(86) PCT No.: PCT/EP2016/076054
§ 371 (c)(1),
(2) Date: Oct. 10, 2018

(87) PCT Pub. No.: WO2017/080848
PCT Pub. Date: May 18, 2017

(65) Prior Publication Data
US 2019/0036425 A1 Jan. 31, 2019

(30) Foreign Application Priority Data
Nov. 11, 2015 (DE) .................. 10 2015 222 266

(51) Int. Cl.
| | |
|---|---|
| *H02K 11/33* | (2016.01) |
| *H02K 11/30* | (2016.01) |
| *B62D 5/04* | (2006.01) |
| *H02K 11/21* | (2016.01) |

(Continued)

(52) U.S. Cl.
CPC .......... *H02K 11/33* (2016.01); *B62D 5/0406* (2013.01); *B62D 5/0421* (2013.01); *H02K 11/21* (2016.01);
(Continued)

(58) Field of Classification Search
CPC ........ H02K 11/00; H02K 11/33; H02K 11/30; H02K 11/21; H02K 29/08; H02K 29/06;
(Continued)

(56) References Cited

U.S. PATENT DOCUMENTS

| | | | | |
|---|---|---|---|---|
| 6,304,448 B1 * | 10/2001 | Fukada | ................. | H05K 7/209 174/16.3 |
| 8,681,506 B2 * | 3/2014 | Nakai | ................. | B62D 5/0406 174/261 |

(Continued)

FOREIGN PATENT DOCUMENTS

| | | |
|---|---|---|
| CN | 103444059 A | 12/2013 |
| DE | 10 2006 056 855 A1 | 6/2008 |

(Continued)

OTHER PUBLICATIONS

International Search Report corresponding to PCT Application No. PCT/EP2016/076054, dated Feb. 13, 2017 (German and English language document) (6 pages).

*Primary Examiner* — Edgardo San Martin
(74) *Attorney, Agent, or Firm* — Maginot, Moore & Beck LLP

(57) ABSTRACT

An electromechanical actuator for rack-and-pinion steering includes a stator, rotor, and electronic system. The electronic system includes at least one first electronic sub-system and a second electronic subsystem, each operatively connected to the stator and the rotor. The at least one first electronic sub-system is arranged at least on a first circuit carrier plane and a second circuit carrier plane, and includes a first power (Continued)

output stage, a first control unit, and a first rotor position sensor arrangement. The second electronic sub-system is arranged at least on the first circuit carrier plane and a third circuit carrier plane, and includes a second power output stage, a second control unit, and a second rotor position sensor arrangement. The first, second and third circuit carrier planes are arranged perpendicular to an axis of rotation of the rotor, and are spaced apart from each other along the axis of rotation.

14 Claims, 3 Drawing Sheets

(51) Int. Cl.
    *H02K 11/00*     (2016.01)
    *H05K 1/14*     (2006.01)

(52) U.S. Cl.
    CPC ...... *H02K 2211/03* (2013.01); *H02K 2213/06* (2013.01); *H02K 2213/12* (2013.01)

(58) Field of Classification Search
    CPC .......... H02K 2211/03; H02K 2213/06; H02K 2213/12; B62D 5/04; B62D 5/0406; B62D 5/0421; H01L 25/16; H01L 25/162; B60R 16/02; H05K 1/14; H05K 1/144
    See application file for complete search history.

(56) References Cited

U.S. PATENT DOCUMENTS

| | | | | |
|---|---|---|---|---|
| 9,338,925 B2* | 5/2016 | Nakano | ................ | B62D 5/0406 |
| 9,438,152 B2* | 9/2016 | Chabaud | ................ | H02K 29/08 |
| 9,444,313 B2* | 9/2016 | Taniguchi | ............. | H02K 29/08 |
| 9,467,086 B2* | 10/2016 | Saito | ......................... | H02P 5/74 |
| 9,586,615 B2* | 3/2017 | Asao | ......................... | H02K 9/22 |
| 10,211,709 B2* | 2/2019 | Asao | .................... | B62D 5/0406 |
| 10,236,750 B2* | 3/2019 | Hirotani | ............. | H02K 11/028 |
| 10,566,879 B2* | 2/2020 | Nishizono | ............ | H01L 23/528 |
| 2009/0021091 A1* | 1/2009 | Shiino | .................... | H02K 3/522 |
| | | | | 310/71 |
| 2010/0319976 A1* | 12/2010 | Nakai | .................... | H02K 11/40 |
| | | | | 174/261 |
| 2013/0099609 A1* | 4/2013 | Ikeno | ..................... | H02K 11/33 |
| | | | | 310/52 |
| 2013/0249335 A1* | 9/2013 | Motoda | ............. | H02K 11/0094 |
| | | | | 310/71 |
| 2017/0008554 A1* | 1/2017 | Hirotani | ................ | H02K 11/02 |

FOREIGN PATENT DOCUMENTS

| | | |
|---|---|---|
| DE | 10 2008 033 061 A1 | 2/2009 |
| DE | 10 2011 007 147 A1 | 10/2012 |
| DE | 10 2012 109 863 A1 | 4/2013 |
| DE | 10 2012 101 006 A1 | 8/2013 |
| DE | 10 2013 204 791 A1 | 9/2013 |
| DE | 11 2012 006 696 T5 | 5/2015 |
| EP | 2 244 359 A1 | 10/2010 |
| JP | H 08-11730 A | 1/1996 |
| JP | 2006-013373 A | 1/2006 |
| JP | 2009-189187 A | 8/2009 |
| JP | 2009-207295 A | 9/2009 |
| JP | 2011-195089 A | 10/2011 |
| JP | 2013-198333 A | 9/2013 |
| WO | 2014054098 A1 | 4/2014 |
| WO | 2014207637 A2 | 12/2014 |

* cited by examiner

ELECTROMECHANICAL ACTUATOR COMPRISING A REDUNDANT ELECTRONIC SUB-SYSTEM

This application is a 35 U.S.C. § 371 National Stage Application of PCT/EP2016/076054, filed on Oct. 28, 2016, which claims the benefit of priority to Serial No. DE 10 2015 222 266.7, filed on Nov. 11, 2015 in Germany, the disclosures of which are incorporated herein by reference in their entirety.

BACKGROUND

The disclosure concerns an electromechanical actuator for rack and pinion steering, wherein the actuator comprises a stator and a rotor. Furthermore, the actuator comprises an electronic system that comprises at least a first electronic sub-system with a first power output stage, a first control unit and a first rotor position sensor arrangement and a second electronic sub-system with a second power output stage, a second control unit and a second rotor position sensor arrangement. In this case, the first electronic sub-system and the second electronic sub-system have an operative connection to the stator and the rotor.

An electromechanical actuator of this type is for example disclosed in the Patent Application DE 10 2006 056 855 A1.

SUMMARY

The disclosure concerns an electromechanical actuator for rack and pinion steering, wherein the actuator comprises a stator and a rotor. Furthermore, the actuator comprises an electronic system that comprises at least a first electronic sub-system with a first power output stage, a first control unit and a first rotor position sensor arrangement and a second electronic sub-system with a second power output stage, a second control unit and a second rotor position sensor arrangement. In this case, the first electronic sub-system and the second electronic sub-system have an operative connection to the stator and the rotor. The core of the disclosure consists of the fact that the first electronic sub-system is disposed at least on a first circuit carrier plane and a second circuit carrier plane and the second electronic sub-system is disposed at least on the first circuit carrier plane and a third circuit carrier plane. Furthermore, the first, second and third circuit carrier planes are disposed perpendicular to an axis of rotation of the rotor and spaced apart from each other along the axis of rotation. It is advantageous here that in the event of failure of one of the two electronic sub-systems, the actuator can also continue to deliver a defined torque. Owing to said defined torque, safety-critical driving maneuvers can continue to be carried out. Comfort functions, such as for example a parking aid, are however no longer necessarily fully supported. Owing to the divided arrangement of the electronic sub-systems on different circuit carrier planes, it is further achieved that the cause of the failure of an electronic sub-system preferably does not lead to the failure of the other electronic sub-system. In addition, owing to the arrangement of the electronic sub-systems on a plurality of circuit carrier planes, the diameter of the actuator can be kept small, which is especially advantageous for an axis-parallel arrangement of the rack and the actuator, with which only limited installation space is available in the radial direction.

An advantageous embodiment of the disclosure provides that the first power output stage, the second power output stage, the first rotor position sensor arrangement and the second rotor position sensor arrangement are disposed on the first circuit carrier plane, the first control unit is disposed on the second circuit carrier plane and the second control unit is disposed on the third circuit carrier plane. It is advantageous here that the control units are disposed on different circuit carrier planes, because in particular these are very sensitive and have an increased risk of failure. In addition, it is advantageous to dispose the power output stages separately from the control units, because the power output stages comprise electromagnetic radiation, which can adversely affect the control units. The EMC of the system can be increased in this way.

A further advantageous embodiment of the disclosure provides that the first control unit and the second control unit are disposed on mutually facing sides of the second circuit carrier plane and the third circuit carrier plane.

It is advantageous here that owing to the arrangement on mutually facing sides, for example the heat generation of the two control units can be dissipated by a common cooling body that is disposed between them.

According to an advantageous embodiment of the disclosure, it is provided that the first circuit carrier plane is at a shorter distance than the other circuit carrier planes from the rotor. It is advantageous here that on the one hand the power output stages are disposed next to the motor contact, whereby the EMC is improved, because noise coupling that is due to parallel guide lines of the power output stages is kept low. On the other hand, the rotor position sensor arrangements are disposed close to the rotor in order to achieve a very high signal quality when measuring the rotor position that is not reduced by other circuit carrier planes that are disposed between the rotor position sensor arrangements and the rotor.

According to a further advantageous embodiment of the disclosure, it is provided that the first electronic sub-system comprises a first voltage link and the second electronic sub-system comprises a second voltage link, wherein the first voltage link and the second voltage link are disposed on the first circuit carrier plane. Furthermore, the first voltage link comprises at least one first capacitor and the second voltage link comprises at least one second capacitor.

It is advantageous here that the EMC of the system is further improved owing to the arrangement of the voltage links on the first circuit carrier plane, because the length of the lines to the power output stages is kept as short as possible and said lines thus have a low impedance.

In one advantageous embodiment, it is provided that the first electronic sub-system comprises a first EMC assembly and the second electronic sub-system comprises a second EMC assembly, which are disposed on a fourth circuit carrier plane. In this case, the fourth circuit carrier plane is disposed perpendicular to the axis of rotation of the rotor and spaced apart along the axis of rotation from the first circuit carrier plane, the second circuit carrier plane and the third circuit carrier plane.

It is advantageous here that owing to the arrangement of the EMC assemblies on the fourth circuit carrier plane, the radial installation space required for the actuator remains small. This is because the EMC assemblies require a lot of space. If said EMC assemblies were to be disposed on one of the other three circuit carrier planes, said circuit carrier plane would have to be increased in the horizontal dimensions thereof in order to be able to accommodate the EMC assemblies. This would however result in a radial enlargement of the actuator, which would be disadvantageous for an axis-parallel arrangement of the rack and actuator.

In a further advantageous embodiment, it is provided that the first rotor position sensor arrangement comprises a first AMR sensor, a first Hall sensor and a second Hall sensor and the second rotor position sensor arrangement comprises a second AMR sensor, a third Hall sensor and a fourth Hall sensor, wherein the first AMR sensor and the second AMR sensor are disposed on the first circuit carrier plane centrally relative to the axis of rotation of the rotor, and wherein the first Hall sensor, the second Hall sensor, the third Hall sensor and the fourth Hall sensor are disposed on the first circuit carrier plane concentrically relative to the axis of rotation of the rotor, wherein the first Hall sensor is disposed offset relative to the second Hall sensor and the third Hall sensor is disposed offset relative to the fourth Hall sensor by an angle of 90° in relation to the axis of rotation of the rotor. It is advantageous here that owing to the central arrangement of the AMR sensors and owing to the concentric arrangement of the Hall sensors relative to the axis of rotation of the rotor, a very accurate measurement of the rotor position can be achieved.

According to an advantageous embodiment of the disclosure, it is provided that the first Hall sensor, the second Hall sensor, the third Hall sensor and the fourth Hall sensor are disposed on a side of the first circuit carrier plane facing away from the rotor. It is advantageous here that owing to the arrangement of the Hall sensors on the side of the first circuit carrier plane facing away from the rotor, the distance between the rotor and the Hall sensors can be adjusted by the thickness of the first circuit carrier plane so that an improved signal quality for rotor position determination can be achieved.

According to a further advantageous embodiment of the disclosure, it is provided that the first AMR sensor and the second AMR sensor are disposed on a side of the first circuit carrier plane facing towards the rotor. It is advantageous here that the signal quality of the AMR sensors is increased owing to the arrangement very close to the rotor.

In an advantageous embodiment, it is provided that the first AMR sensor and the second AMR sensor are disposed on opposite sides of the first circuit carrier plane. It is advantageous here that the attachment of the AMR sensors to the first circuit carrier plane is kept simple, because both AMR sensors can be disposed centrally relative to the axis of rotation without having to be stacked, for example.

In a further advantageous embodiment, it is provided that the first circuit carrier plane has a thickness between 0.8 mm and 1.6 mm in a region on which the first rotor position sensor arrangement and the second rotor position sensor arrangement are disposed. It is advantageous here that despite the arrangement of one of the AMR sensors on a side facing away from the rotor, the same is disposed close enough to the rotor that a good measurement result can be delivered, but the Hall sensors that are also disposed on the side facing away from the rotor are disposed far enough from the rotor in order to also be able to deliver a good measurement result.

According to an advantageous embodiment of the disclosure, it is provided that the first rotor position sensor arrangement comprises a first TMR sensor and the second rotor position sensor arrangement comprises a second TMR sensor, wherein the first TMR sensor and the second TMR sensor are disposed on the first circuit carrier plane centrally relative to the axis of rotation of the rotor.

It is advantageous here that the TMR sensors are sufficient for the determination of the rotor position, whereby the design of the rotor position sensor arrangements is simplified.

According to a further advantageous embodiment of the disclosure, it is provided that the first electronic sub-system and the second electronic sub-system are disposed in a common housing.

It is advantageous here that both electronic sub-systems are suitably protected against external influences that could possibly lead to a failure and in addition only one housing is necessary for both electronic sub-systems.

In an advantageous embodiment, it is provided that the housing comprises inward protrusions that essentially spatially separate at least the first control unit and the second control unit from each other. It is advantageous here that the risk is reduced that causes of defects that result in the failure of one of the control units also result in the failure of the other control unit.

In a further advantageous embodiment, it is provided that the housing is designed in such a way that the first electronic sub-system and the second electronic sub-system are disposed in the housing essentially spatially separated from each other.

It is advantageous here that it can possibly be prevented that causes of defects that lead to the failure of one of the electronic sub-systems also lead to the failure of the other electronic sub-system.

DETAILED DESCRIPTION

Figure 1:
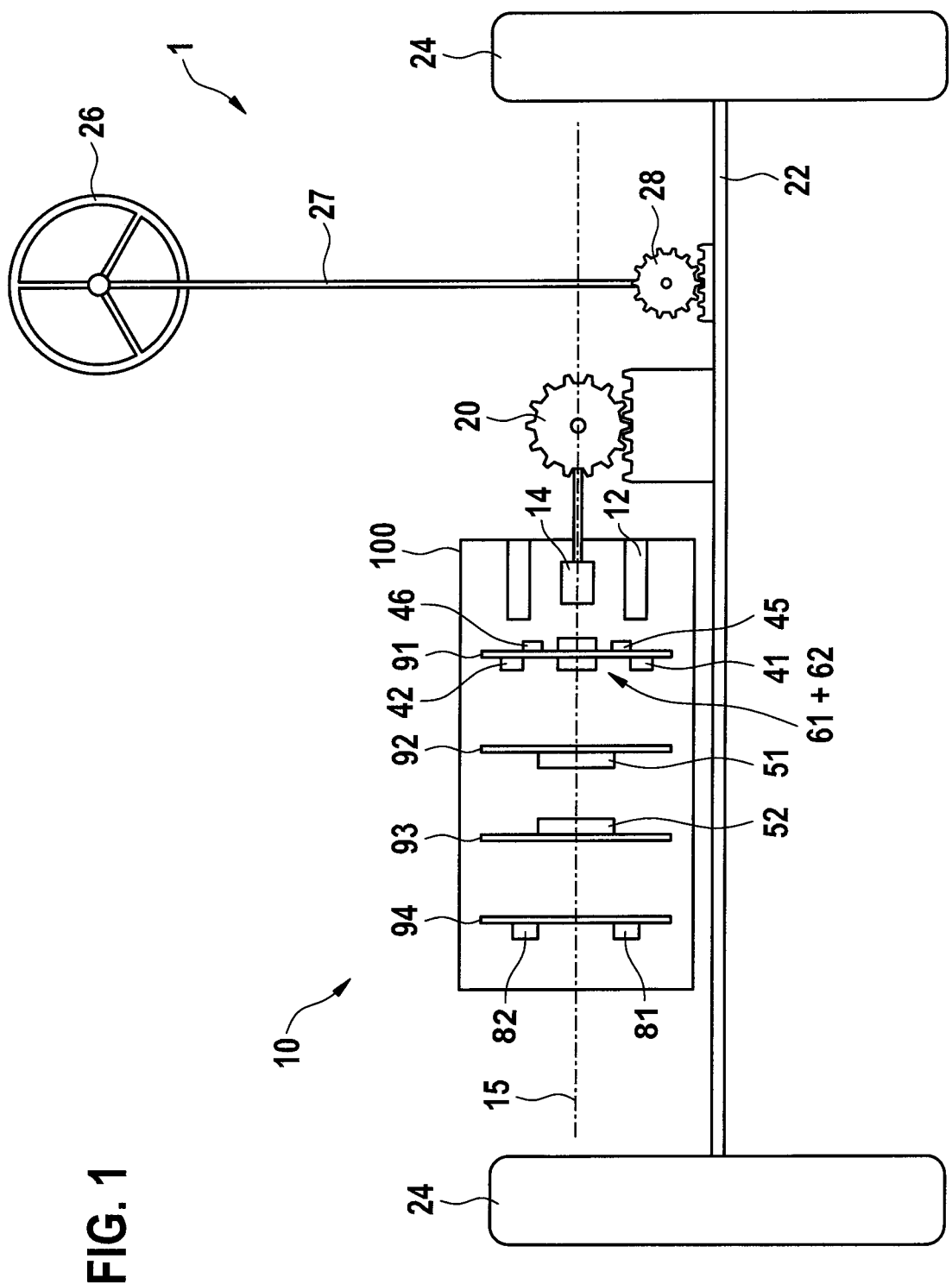
FIG. 1 shows a first exemplary embodiment of an electromechanical actuator according to the disclosure that is disposed in a steering system.

FIG. 1 shows a first exemplary embodiment of an electromechanical actuator according to the invention that is disposed in a steering system. an electromechanical actuator 10 is represented. The actuator 10 is used to support a steering system 1 that engages a rack 22 by means of a steering wheel 26, a steering column 27 and a steering pinion 28, and thereby can pass steering commands from a driver to wheels 24 connected to the rack 22. The actuator 10 comprises a stator 12 and a rotor 14. The rotor 14 engages the rack 22 via a pinion 20. Furthermore, the actuator 10 or an axis of rotation 15 of the rotor 14 is disposed axis-parallel to the rack 22. The actuator 10 also comprises a first electronic sub-system and a second electronic sub-system, which together form an electronic system of the actuator 10. The first electronic sub-system comprises in turn a first power output stage 41, a first control unit 51 and a first rotor position sensor arrangement 61. The second electronic sub-system comprises a second power output stage 42, a second control unit 52 and a second rotor position sensor arrangement 62. The first electronic sub-system preferably also comprises a first voltage link 45 and a first EMC assembly 81 and the second electronic sub-system comprises a second voltage link 46 and a second EMC assembly 82. The first electronic sub-system is disposed on a first circuit carrier plane 91, a second circuit carrier plane 92 and a fourth circuit carrier plane 94. The second electronic sub-system is disposed on the first circuit carrier plane 91, a third circuit carrier plane 93 and the fourth circuit carrier plane 94. The first power output stage 41, the second power output stage 42, the first rotor position sensor arrangement 61 and the second rotor position sensor arrangement 62 are disposed on the first circuit carrier plane 91. In addition, the first voltage link 45, which comprises at least one first capacitor that is not shown in the figure, and the second voltage link 46, which comprises at least one second capacitor that is not shown in the figure, are disposed on the first circuit carrier plane 91. The first control unit 51 is disposed on the second circuit carrier plane 92. The second control unit 52 is disposed on the third circuit carrier plane 93. Furthermore, the first EMC assembly 81 and the second EMC assembly 82 are disposed on the fourth circuit carrier plane 94. The actuator 10 is disposed in a housing 100.

The windings of the first electronic sub-system and the second electronic sub-systems, both of which are disposed on the stator 12 in order to drive the rotor 14, are not shown in the figure.

In an alternative exemplary embodiment that is not shown in the figure, the fourth circuit carrier plane is used as a cover for the housing 100 of the actuator 10.

Figure 2:
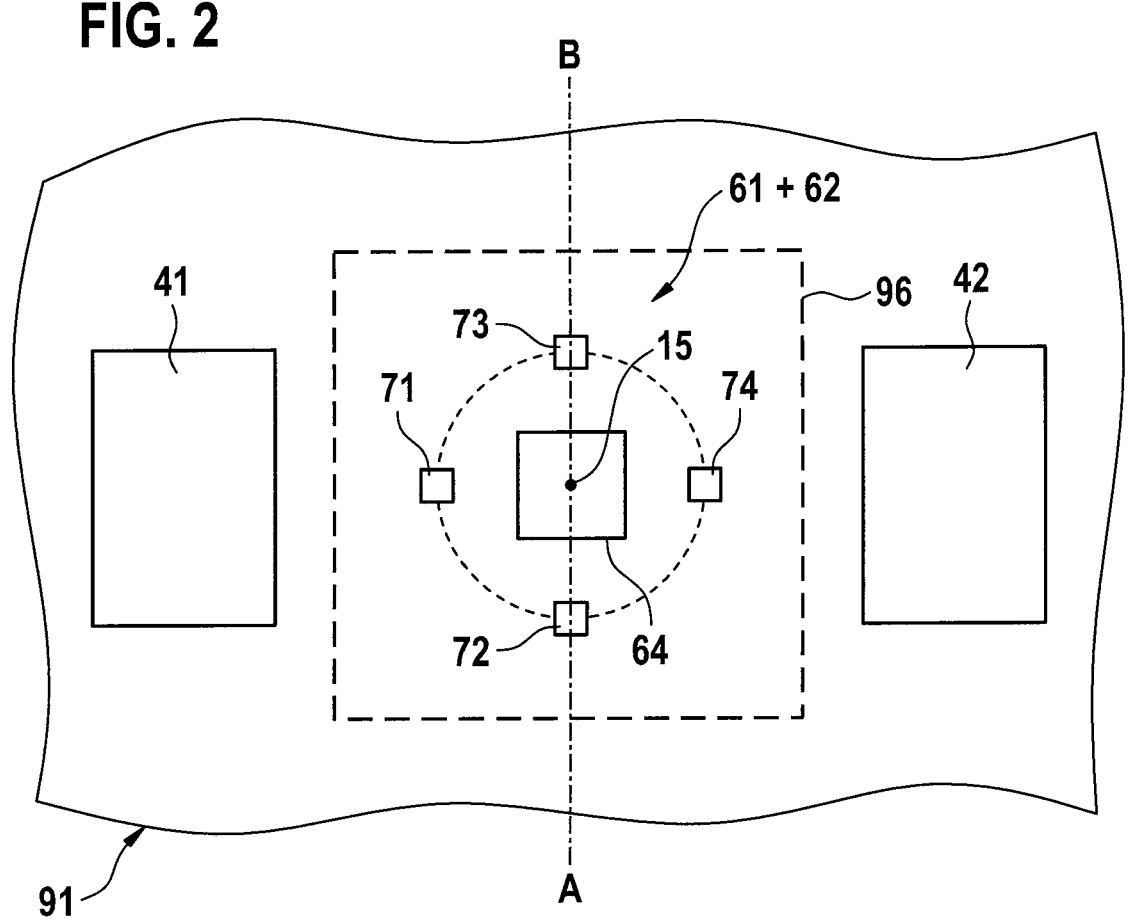
FIG. 2 shows a top view of an embodiment of the first circuit carrier plane from FIG. 1 in detail.

FIG. 2 shows a top view of an embodiment of the first circuit carrier plane from FIG. 1 in detail. The first circuit carrier plane 91 is represented. The axis of rotation 15 of the rotor 14 is perpendicular to the first circuit carrier plane 91. the first rotor position sensor arrangement 61 and the second rotor position sensor arrangement 62 are disposed in a region of the first circuit carrier plane 91 for contactlessly sensing the rotor position of the rotor 14, wherein the rotor 14 comprises a sender magnet for this that is not shown in the figure and that is centered relative to the axis of rotation 15. The first rotor position sensor arrangement 61 comprises a first AMR sensor 64, a first Hall sensor 71 and a second Hall sensor 72. The second rotor position sensor arrangement comprises a second AMR sensor 65, which is not represented here in the figure, a third Hall sensor 73 and a fourth Hall sensor 74. The first and second rotor position sensor arrangements 61, 62 can both be implemented digitally and in analog form here. The first power output stage 41 and the second power output stage 42 are also disposed on the first circuit carrier plane 91, but outside of the region 96. The first AMR sensor 64 is disposed centrally relative to the axis of rotation 15 of the rotor 14. The second AMR sensor 65 is also disposed centrally relative to the axis of rotation 15 of the rotor 14, but either concealed by the first AMR sensor 64 or on the other side of the first circuit carrier plane 91, and thus not visible here. The first Hall sensor 71, the second Hall sensor 72, the third Hall sensor 73 and the fourth Hall sensor 74 are disposed concentrically relative to the axis of rotation 15 of the rotor 14. In this case, the first Hall sensor 71 is disposed offset from the second Hall sensor 72 by an angle of 90° relative to the axis of rotation 15 of the rotor 14. Likewise, the third Hall sensor 73 is disposed offset from the fourth Hall sensor 74 by an angle of 90° relative to the axis of rotation 15 of the rotor 14.

The first rotor position sensor arrangement 61 and the second rotor position sensor arrangement 62 are for example both disposed on a circuit carrier that is not shown in the figure and that is a part of the first circuit carrier plane 91 in the region 96. Likewise, the first power output stage 41 and the second power output stage 42 are for example disposed on separate circuit carriers that are not shown, which for example can be embodied as direct-bonded copper substrates and furthermore are parts of the first circuit carrier plane 91.

In an alternative exemplary embodiment that is not shown in the figure, the first Hall sensor 71 and the second Hall sensor 72, or even the third Hall sensor 73 and the fourth Hall sensor 74, can be arbitrarily disposed on the first circuit carrier plane 91 in the region 96 while retaining the respective 90° angle between the first and second Hall sensors 71, 72 or between the third and fourth Hall sensors 73, 74 and while retaining the concentric arrangement relative to the axis of rotation 15 of the rotor 14.

Figure 3:
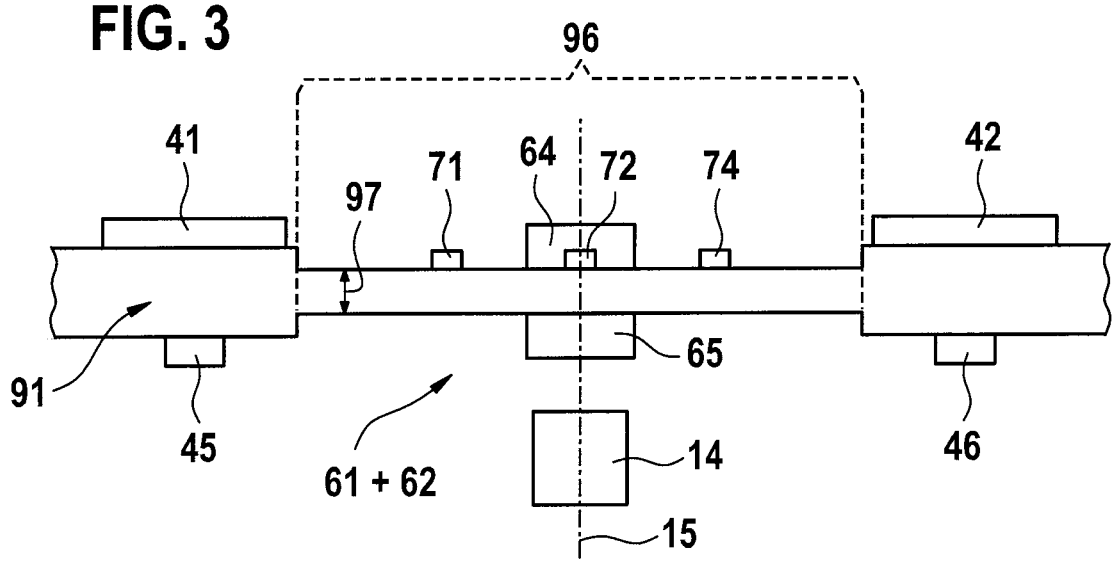
FIG. 3 shows a side view of an embodiment of the first circuit carrier plane from FIG. 1 in detail.

FIG. 3 shows a side view of an embodiment of the first circuit carrier plane from FIG. 1 in detail, wherein the direction of view is from point A to point B according to FIG. 2. The first circuit carrier plane 91 is represented. The axis of rotation 15 of the rotor 14 is perpendicular to the first circuit carrier plane 91. A first AMR sensor 64 is disposed on a side of the first circuit carrier plane 91 facing away from the rotor 14, and a second AMR sensor 65 is disposed on side of the first circuit carrier plane 91 facing towards the rotor 14. In this case, the first AMR sensor 64 and the second AMR sensor 65 are disposed centrally relative to the axis of rotation 15 of the rotor 14. Furthermore, a first Hall Sensor 71, a second Hall sensor 72, a third Hall sensor 73, which is not shown in the figure, and a fourth Hall sensor 74 are disposed on the side of the circuit carrier plane 91 facing away from the rotor 14. In this case, the first AMR sensor 64, the first Hall sensor 71 and the second Hall sensor 72 form the first rotor position sensor arrangement 61. The second AMR sensor 65, the third Hall sensor 73, which is concealed at said viewing angle by the first AMR sensor 64, and the fourth Hall sensor 74 form the second rotor position sensor arrangement 62. The first rotor position sensor arrangement 61 and the second rotor position sensor arrangement 62 are disposed on the first circuit carrier plane 91 in a region 96. The first circuit carrier plane 91 has a defined thickness 97 in said region 96 that preferably lies between 0.8 mm and 1.6 mm.

In an alternative exemplary embodiment that is not shown in the figure, the first AMR sensor 64 and the second AMR sensor 65 can also both be disposed on the side of the first circuit carrier plane 91 facing towards the rotor 14. However, in order to maintain the concentric arrangement of the first and second AMR sensors 64, 65 relative to the axis of rotation 15 of the rotor 14, said first and second AMR sensors 64, 65 must be disposed in a stacked arrangement.

In a further alternative exemplary embodiment that is not shown in the figure, the first and the second Hall sensors 71 and 72 or even the third and the fourth Hall sensors 73 and 74 can be disposed on the side of the first circuit carrier plane 91 facing towards the rotor 14.

Figure 4:
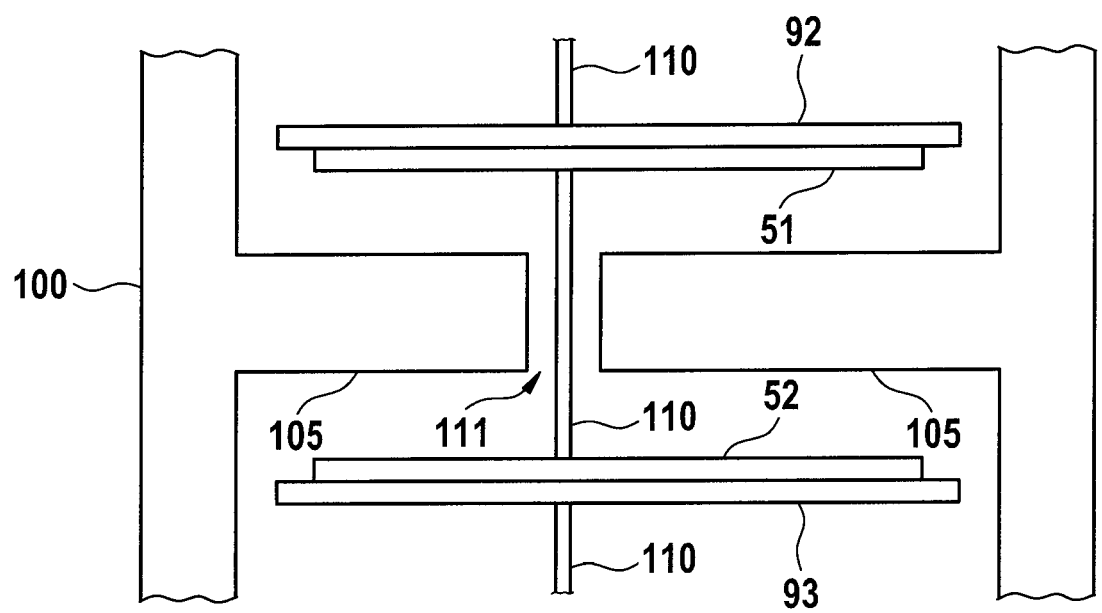
FIG. 4 shows a detailed side view of a section of the actuator according to FIG. 1.

FIG. 4 shows a detailed side view of a section of the actuator according to FIG. 1. A part of a housing 100 of the actuator 10 is represented, in which the second circuit carrier plane 92 and the third circuit carrier plane 93 are disposed. The first control unit 51 is disposed on the second circuit carrier plane 92 and the second control unit 52 is disposed on the third circuit carrier plane 93. The first control unit 51 and the second control unit 52 are essentially spatially separated from each other by protrusions 105 of the housing 100. Said protrusions 105 can for example also be embodied as cooling bodies in order to pass heat generated by power losses from the actuator 10 to the exterior. The protrusions 105 only comprise at least one aperture 111, through which a signal feed or even a current feed 110 is passed between the second circuit carrier plane 92 and the third circuit carrier plane 93. Connections for the signal feed or even the current feed 110 can for example be implemented by means of plug connectors or even press-fit pins.

In an alternative exemplary embodiment that is not shown in the figure, such protrusions 105 of the housing 100 can be provided with suitable apertures 111 for the signal feed or even the current feed 110 between other or even all circuit carrier planes 91, 92, 93 and 94.

The invention claimed is:

1. An electromechanical actuator for rack and pinion steering, comprising:
   a stator;
   a rotor; and
   an electronic system, including:
      at least one first electronic sub-system having a first power output stage, a first controller, and a first rotor position sensor arrangement; and
      a second electronic sub-system having a second power output stage, a second controller, and a second rotor position sensor arrangement,
      wherein the at least one first electronic sub-system and the second electronic sub-system are operatively connected to the stator and to the rotor,
      wherein the first power output stage, the second power output stage, the first rotor position sensor arrangement and the second rotor position sensor arrangement are positioned on a first circuit carrier plane, the first controller is positioned on a second circuit carrier plane, and the second controller is positioned on a third circuit carrier plane, and
      wherein the first circuit carrier plane, the second circuit carrier plane, and the third circuit carrier plane are disposed perpendicular to an axis of rotation of the rotor and are spaced apart from each other along the axis of rotation.

2. The electromechanical actuator as claimed in claim 1, wherein the first controller and the second controller are positioned on mutually facing sides of the second circuit carrier plane and the third circuit carrier plane, respectively.

3. The electromechanical actuator as claimed in claim 1, wherein the first circuit carrier plane is at a shorter distance from the rotor than the second and third circuit carrier planes.

4. The electromechanical actuator as claimed in claim 1, wherein:
   the at least one first electronic sub-system further includes a first voltage link;
   the second electronic sub-system further includes a second voltage link;
   the first voltage link and the second voltage link are positioned on the first circuit carrier plane;
   the first voltage link has at least one first capacitor; and
   the second voltage link has at least one second capacitor.

5. The electromechanical actuator as claimed in claim 1 wherein:
   the at least one first electronic sub-system further includes a first EMC assembly;
   the second electrical sub-system further includes a second EMC assembly; and
   the first EMC assembly and the second EMC assembly are positioned on a fourth circuit carrier plane that is perpendicular to the axis of rotation of the rotor and spaced apart along the axis of rotation from the first circuit carrier plane, the second circuit carrier plane and the third circuit carrier plane.

6. The electromechanical actuator as claimed in claim 1, wherein:
   the first rotor position sensor arrangement has a first AMR sensor, a first Hall sensor, and a second Hall sensor;
   the second rotor position sensor arrangement has a second AMR sensor, a third Hall sensor, and a fourth Hall sensor;
   the first AMR sensor and the second AMR sensor are positioned on the first circuit carrier plane so as to be centrally located relative to the axis of rotation of the rotor;
   the first Hall sensor, the second Hall sensor, the third Hall sensor and the fourth Hall sensor are positioned on the first circuit carrier plane so as to be arranged concentrically relative to the axis of rotation of the rotor;
   the first Hall sensor is offset from the second Hall sensor by an angle of 90° about the axis of rotation of the rotor; and
   the third Hall sensor is offset from the fourth Hall sensor by an angle of 90° about the axis of rotation of the rotor.

7. The electromechanical actuator as claimed in claim 6, wherein the first Hall sensor, the second Hall sensor, the third Hall sensor and the fourth Hall sensor are positioned on a side of the first circuit carrier plane facing away from the rotor.

8. The electromechanical actuator as claimed in claim 6, wherein the first AMR sensor and the second AMR sensor are positioned on a side of the first circuit carrier plane facing towards the rotor.

9. The electromechanical actuator as claimed in claim 6, wherein the first AMR sensor and the second AMR sensor are positioned on respective sides of the first circuit carrier plane that face away from each other.

10. The electromechanical actuator as claimed in claim 9, wherein the first circuit carrier plane has a thickness between 0.8 mm and 1.6 mm in a region on which the first rotor position sensor arrangement and the second rotor position sensor arrangement are positioned.

11. The electromechanical actuator as claimed in claim 1, wherein:
    the first rotor position sensor arrangement has a first TMR sensor;
    the second rotor position sensor arrangement has a second TMR sensor; and
    the first TMR sensor and the second TMR sensor are positioned on the first circuit carrier plane so as to be centrally located relative to the axis of rotation of the rotor.

12. The electromechanical actuator as claimed in claim 1, wherein the at least one first electronic sub-system and the second electronic sub-system are positioned in common housing.

13. The electromechanical actuator as claimed in claim 12, wherein the housing includes inward protrusions that essentially spatially separate at least the first controller and the second controller from each other.

14. The electromechanical actuator as claimed in claim 12, wherein the housing is configured such that the at least one first electronic sub-system and the second electronic sub-system are positioned in the housing essentially spatially separated from each other.

* * * * *